United States Patent

Pehkonen et al.

[19]

[11] Patent Number: 5,949,790
[45] Date of Patent: Sep. 7, 1999

[54] DATA TRANSMISSION METHOD, AND TRANSMITTER

[75] Inventors: Kari Pehkonen; Kari Rikkinen, both of Oulu, Finland

[73] Assignee: Nokia Mobile Phones Limited, Espoo, Finland

[21] Appl. No.: 08/930,856

[22] PCT Filed: Nov. 15, 1995

[86] PCT No.: PCT/FI95/00632

§ 371 Date: Dec. 2, 1997

§ 102(e) Date: Dec. 2, 1997

[87] PCT Pub. No.: WO96/32781

PCT Pub. Date: Oct. 17, 1996

[30] Foreign Application Priority Data

Apr. 11, 1995 [FI] Finland .................................. 951729

[51] Int. Cl.⁶ ............................................. H04J 3/22
[52] U.S. Cl. ........................... 370/465; 370/529; 714/755
[58] Field of Search .................................... 370/320, 335, 370/342, 441, 470, 479, 537, 538, 539, 540, 541, 527, 529, 314, 326, 329, 343, 465, 468, 472, 505, 506; 375/205; 348/423; 714/755, 756

[56] References Cited

U.S. PATENT DOCUMENTS

| | | | |
|---|---|---|---|
| 4,907,233 | 3/1990 | Deutsch et al. | 371/37.4 |
| 5,383,219 | 1/1995 | Wheatley, III et al. | 375/1 |
| 5,392,299 | 2/1995 | Rhines et al. . | |
| 5,396,653 | 3/1995 | Kivari et al. | 455/88 |
| 5,430,740 | 7/1995 | Kivari et al. | 371/37.1 |
| 5,461,639 | 10/1995 | Wheatley, III et al. | 375/205 |
| 5,465,267 | 11/1995 | Todoroki . | |
| 5,506,903 | 4/1996 | Yamashita . | |
| 5,570,353 | 10/1996 | Keskitalo et al. | 370/18 |
| 5,577,024 | 11/1996 | Malkamaki et al. | 370/18 |
| 5,600,374 | 2/1997 | ShikaKura . | |
| 5,606,548 | 2/1997 | Vayrynen et al. | 370/252 |
| 5,691,995 | 11/1997 | Ikeda et al. . | |
| 5,708,665 | 1/1998 | Luthi et al. . | |
| 5,742,619 | 4/1998 | Hassan . | |
| 5,901,135 | 5/1999 | Chung et al. . | |

FOREIGN PATENT DOCUMENTS

| | | |
|---|---|---|
| EP 0 634 840 | 1/1995 | European Pat. Off. . |
| WO 94/19876 | 9/1994 | WIPO . |
| WO 95/19664 | 7/1995 | WIPO . |

OTHER PUBLICATIONS

CDMA radio interface proposal for FPLMTS, International Telecommunication Union, Radiocommunication Study Groups, document 8/1/Temp/142(rev1).

IEEE Journal on Selected Areas in Communications, vol. 12, No. 4, May 1994, Design Study for a CDMA–Based Third–Generation Mobile Radio System, Baier, A.

Primary Examiner—Chau Nguyen
Assistant Examiner—Ken Vanderpuye
Attorney, Agent, or Firm—Perman & Green, LLP

[57] ABSTRACT

The invention relates to a data transmission method in a wireless data transmission system where signals with one or more data rates and quality levels are transmitted simultaneously. In order for it to be possible to transmit information on the radio path at different rates and quality requirements, the transmitter according to the invention comprises forward error correction coders (206, 208) for carrying out outer coding for at least some of the signals to be transmitted so that all the signals to be transmitted have a common quality level, a multiplexer (214) for combining the signals to be transmitted into frames having a given length, a forward error correction coder (220) for carrying out inner coding for the frames to be transmitted, and a mechanism (222) for repeating or deleting symbols in each frame, if necessary, so that the length of the symbols or each frame equals that of a multifold of a time interval that is known and essentially shorter than the symbol length. The transmitter according to the invention further comprises control logic (254) for adjusting the transmitting power used during transmission of each frame proportionally to the number of symbols each frame had prior to symbol repetition.

19 Claims, 3 Drawing Sheets

DATA TRANSMISSION METHOD, AND TRANSMITTER

FIELD OF TECHNOLOGY

The present invention relates to a data transmission method in a wireless data transmission system where signals with one or more data rates and quality levels are transmitted simultaneously.

The invention further relates to a transmitter intended to be used in the wireless data transmission system where signals with one or more data rates and quality levels are transmitted simultaneously.

PRIOR ART TECHNOLOGY

Requirements set for data transmission methods are continuously increasing. This particularly concerns wireless data transmission systems, such as cellular communication systems of which ever more versatile services are required, such as various kinds of data and video services.

Conventionally, wireless data transmission systems have only been used for speech transmission. An increase in the number of various kinds of services to be transferred means, as far as particularly wireless services are concerned, that the system must be able to transmit signals with differing capacity over the radio path, for example, speech at the data rate 8 kbit/s and data at the rate 64 kbit/s. In addition, there is need for transmitting signals with different quality levels, which typically also require different data rates simultaneously. As a typical example, a video connection could be mentioned in which the picture requires a high data rate but the sound may be transmitted at a slower data rate and at a lower quality level. Consequently, an efficient operation is required of the data transmission system in an environment where transmissions at a multitude of data rates, quality levels and service types are transmitted.

A prior art method of transmitting signals at a multitude of data rates, particularly in applying a CDMA multiple access method, is described in the publication "CDMA radio interface proposal for FPLMTS", International Telecommunications Union, Radiocommunications Study Groups, document 8/1/TEMP/142 (rev1), which is herein incorporated as reference. In the solution according to the above publication, signals between the data rates 1.2–38.4 kbit/s can be transmitted, if the system bandwidth is 1.23 MHz. Higher data rates (76.8 kbit/s) are possible if the system bandwidth is increased to 2.46 MHz. Depending on the data rate of the signal to be transmitted, the signal is channel coded by a convolution code whose coding depth is ⅓, ½ or ¾. In addition, transmitting power is adjusted according to the data rate.

In the method set forth, transmissions are possible at a few specific data rates only. In addition, if several services having different quality requirements are transmitted in parallel, the transmission channel cannot efficiently be utilized because the signal with the lowest quality level sets the transmission requirements.

Another prior art method is described in the publication Baier, A., Fiebig, U.-C., Granzow, W., Koch, W., Teder, P., Thielecke, J.: Design Study for a CDMA-based third generation mobile radio system, IEEE Journal on Selected Areas in Communications, 1994, Vol. 12, no. 4, pp. 733–743, which is herein incorporated as reference. In the method set forth, a fixed length 10 ms frame is used. The transmission rate can change on a frame by frame basis. Convolution coding with puncturing for speech, and concatenated convolution coding as well as Reed-Solomon coding for data are used. A separate control channel is used to inform the receiver of the frame structure and the transmission rate. The control channel and the traffic channel are transmitted in parallel using same spreading code, but in different phase. The signals of both the channels are linearly combined prior to the transmission.

This method needs a large buffer in the receiver because the signal received on the control channel must be decoded before the decoding of the traffic channel can begin. This also introduces additional delay. The linear combining of the traffic channel and the control channel results in a multilevel PAM signal. Ordinary receivers of a mobile station use non-linear power amplifiers to minimize power consumption which, however, distort the multilevel signal.

CHARACTERISTICS OF THE INVENTION

It is an object of the present invention to provide a method and transmitter by means of which efficient transmission of information on the radio path is possible at a multitude of transmission rates. Rate changes are compensated for by adjusting transmitting power, whereby the bit energy versus noise and interference caused by other users remains constant, especially in using the CDMA multiple access method. The method of the invention may be applied to several multiple access methods.

This is achieved by a method set forth in the introduction, which is characterized in that outer coding is performed for at least some of the signals so that all the signals to be transmitted have a common quality level, and that signals thus acquired having a common quality level are combined into frames of a given length, and that inner coding is performed for the combined signal, and that some symbols are repeated or deleted in the frames to be transmitted, if necessary, so that the length of the symbols of each frame is a multifold of a time interval that is known and essentially shorter than the symbol length, and that the transmitting power used for transmitting each frame depends on the number of bits each frame had prior to symbol repetition.

The transmitter according to the invention is characterized in that it comprises means for carrying out outer coding for at least some of the signals to be transmitted so that all the signals to be transmitted have a common quality level, means for combining the signals to be transmitted into frames having a given length, means for carrying out inner coding for the frames to be transmitted, means for repeating or deleting symbols in each frame, if necessary, so that the length of the symbols of each frame equals that of a multifold of a time interval that is known and essentially shorter than the symbol length, as well as means for adjusting the transmitting power used during transmission of each frame proportionally to the number of symbols each frame had prior to symbol repetition.

In the method according to the invention, thus, the signals having different transmission rates and quality levels are coded so that they can be combined into one signal with one quality requirement. A common coding and symbol rate justification are carried out for this signal with one quality requirement. Symbol justification may be carried out so that the actual transmission is performed at several transmission rates frame specifically. The frame structure multiplexing enables a binary PAM signal whereby non-linear power amplifiers may be used without causing any signal distortion. A much more efficient utilization of the transmission channel resources is possible than by the prior art methods.

DESCRIPTION OF THE DRAWINGS

In the following, the preferred embodiments of the invention are described in closer detail with reference to the accompanying drawings, in which.

DESCRIPTION OF THE PREFERRED EMBODIMENTS

Figure 1:
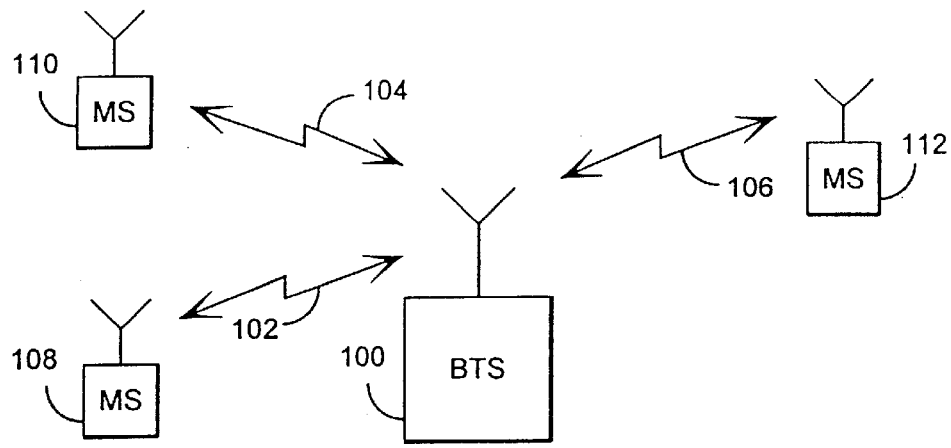
FIG. 1 shows an example of a wireless data transmission system to which the method of the invention can be applied.

FIG. 1 illustrates a wireless data transmission method, i.e. a section of a cellular communication system to which the method according to the invention can be applied. The system comprises a base station 100 having a bi-directional connection 102–106 to subscriber end terminals 108–112. The CDMA multiple access system serves as an example of the cellular communication system used, and in the following the invention will be described as applied to the CDMA system not, however, restricting it thereto, as will be obvious for a person skilled in the art. The essential features of the invention are independent of the multiple access method used.

In the exemplary system of FIG. 1, each connection typically employs a separate spreading code whose bit rate, i.e. a so-called chip rate, is essentially higher than the data rate, and by which the information to be transmitted is multiplied and consequently spread onto a wide frequency band. On the basis of the spreading code, the receivers are able to identify the desired signal from among other signals transmitted on the same frequency band. The method of the invention can be applied to and the transmitter solution of the invention can be utilized by both the end terminal and the base station.

In the following, the first preferred embodiment of the method according to the invention is illustrated by the block diagram of FIG. 2a. It is assumed that the transmitter's function is to transmit a group of different signals 200, 202, 204, each having an individual quality level requirement and an individual data rate during transmission. A typical way to measure the signal quality and to indicate the quality level it requires is the bit error ratio BER, which indicates the ratio of erroneous bits to all the bits. Let us assume, as an example, that signal 200 has the quality requirement BER1, for instance, $10^{-3}$, signal 202 BER2, for instance $10^{-6}$, and signal 204 BER3, for instance $10^{-7}$. The signal 200 may consist of, e.g., speech, the signal 204 of video image, and the signal 202 of other data information.

All the signals to be transmitted are combined by a multiplexer 214 into frames of equal duration. Each frame at the output of the multiplexer may contain bits of one or more data sources. The number of bits in a frame may vary depending on the bits of the data sources at the multiplexer input, but the frame length in time domain is constant. In the method according to the invention, a common quality requirement is achieved for all the signals prior to the combining by carrying out outer coding for the signals requiring a higher quality level, i.e. in the example of the figure, for the signals 202 and 204. The Reed-Solomon coding may advantageously be used as the outer coding, because it is well suited for correcting errors with bursts. For services that are not critical to delay, additional interleaving 210, 212 can be performed over multiple frames.

Thus, all the signals 200, 216, 218 to be transmitted have a common quality level requirement BER1 at this stage. These signals are multiplexed into one signal 248, for which a common inner coding is performed. This common coding may in principle be carried out by any code, but in the preferred embodiment of the invention a convolution code is employed, by which the common quality requirement may be moderated.

Following the common coding, a repetition coding is carried out for the coded signal 250 so that, in the case of CDMA, the length of symbols in each frame is a multifold of the chip period. Repetition coding is performed by repeating the necessary number of symbols in the frame. As the frame length is constant, the length of symbols changes, due to the repetition, to what is desired. Because of the fact that the various frames of the signal may, following the common coding, have a different number of coded symbols depending on the data rate of each signal, the number or symbols to be repeated and consequently the protection of bits in each frame varies. This drawback is, however, alleviated by the convolution code used as the common code, because the unequal repetition coding is spread over several information bits due to the memory of the convolution code.

In the signal 224 following the repetition coding, each signal frame for the different services may still have a different number of symbols. A signal originally to be transferred at a low transmission rate may even after the repetition coding have a lower number of symbols than a signal originally to be transferred at a high transmission rate. The number of symbols thus repeated does not vary much in different frames, which means that the received signal (prior to deinterleaving) does not have a varying reliability.

Instead of the repetition coding, it is possible in each frame to delete some symbols, if necessary, so that the number of symbols in each frame equals a multifold of the chip period.

Due to the fact that every frame may contain bits of different data sources thus resulting in a varying transmission rate in each frame, said information must be transmitted to the receiver in the signal to be transferred. In the preferred embodiment of the invention, the indication of the frame structure 226 is coded and combined with the signal to be transmitted. For a signal 252 thus combined, a common interleaving can be performed.

Figure 4:
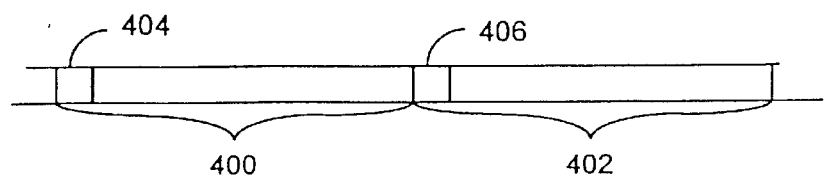
FIG. 4 illustrates transmission of bit rate symbols.

According to another embodiment of the invention, indication of the structure of the subsequent frame to be transmitted is transmitted in each frame. This is illustrated in FIG. 4 which shows two frames to be transmitted one after the other, out of which the frame 400 is transmitted first and then the frame 402. The frame structure symbols 404 contained in the first frame 400 include indication of the structure of the frame 402. Correspondingly, the frame structure bits contained in frame 402 include indication of the structure of the subsequent frame to be transmitted (not shown). Thus, the information on the structure of each frame is already included in the receiver when it receives the frame, but delay is increased at the transmitting end.

Figure 3A:
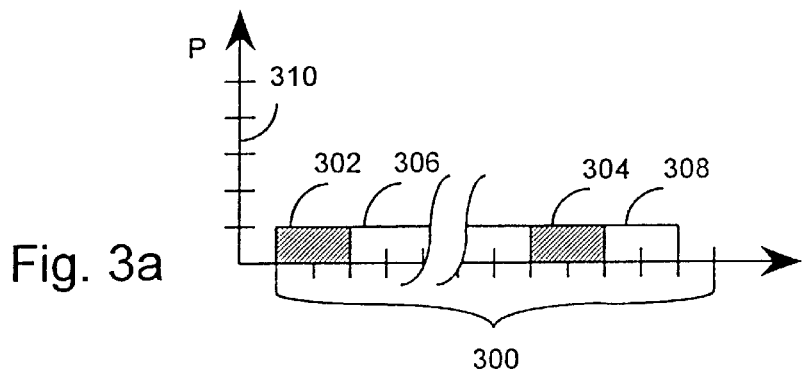
FIGS. 3a and 3b illustrate adding additional information to the frame.
Figure 3B:
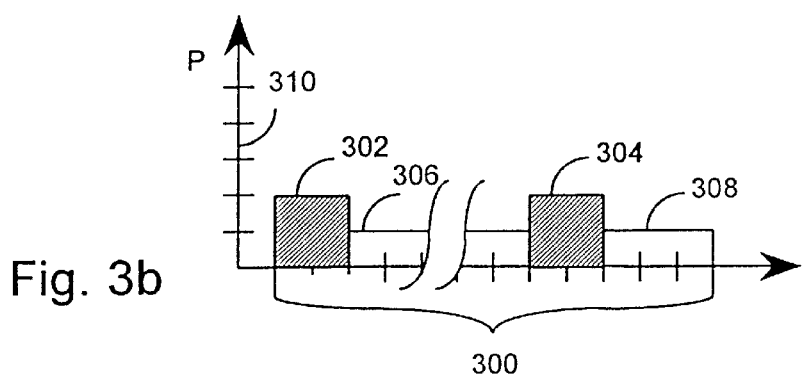

Other reference information may also be combined into the signal to be transmitted, such as information 230 concerning power adjusting, or reference symbols 228 required by a coherent detection. The symbols to be added may be spread into the frame to one or more groups, as illustrated in the example of FIG. 3a. The figure shows one frame 300 to be transmitted, which comprises the actual data symbol blocks 306, 308 as well as the additional symbol blocks 302, 304. During the frame, all the symbols are transmitted at the same transmitting power. FIG. 3b illustrates a second embodiment. The vertical axis 310 depicts transmitting power used during transmission, and the additional symbols 302, 304 are transmitted at a higher transmitting power than the actual data blocks 306, 308. This way, the correctness of the reference and power adjusting symbols, as well as synchronization, can be ensured in the reception.

In the CDMA system, the signal 240 to be transmitted thus obtained is multiplied by a spreading code unique for each connection whereby the signal to be transmitted spreads onto the whole frequency band used.

The broadband signal obtained is further fed through radio frequency parts 244 to an antenna 246 for transmission.

The transmitting power used in the transmission of each frame depends on the original number of symbols in the frame, that is, on the number of symbols prior to symbol repetition 222. Thus, as the CDMA method is applied, the various transmission rates are compensated for by the transmitting power in order for the ratio of bit energy to noise and interference $E_b/N_0$ to remain constant during transmission. Consequently, the frames which originally comprise a large number of bits are transmitted at a higher transmitting power than those frames with a smaller number of bits.

In the following, the first preferred structure of a transmitter according to the invention is illustrated by the block diagram of FIG. 2a. The transmitter of the invention comprises a number of data transmitters 256–260 whose output signals 200–204 may have different quality level requirements and data rates, and which data sources may produce signals to be transmitted simultaneously. Typical data transmitters of this kind include a speech coder, telefax, video coder, or any other source producing digital information.

The transmitter according to the invention further comprises first means 206, 208 for carrying out outer coding for at least some of the signals to be transmitted so that the quality level requirement of the signals thus coded equals, as a result of the coding, the lowest quality level requirement of active data sources. This way, the same quality level requirement can be achieved for all the signals to be transmitted. The coding used can be carried out by the prior art methods, and the Reed-Solomon coding method may advantageously be used. The transmitter may also comprise first means 210, 212 for interleaving the coded signals, i.e. for changing the position of the symbols of the signal according to any known algorithm.

The signals from all the data sources, which signals have a common quality level requirement, are fed to multiplexing means 214 where the signals are combined as described above into frames of equal length in time domain, which frames may contain a different number of bits on a frame by frame basis depending on the signals applied to the multiplexer input. The output of the multiplexing means is operationally connected to second coding means 220 where inner coding is carried out for the signal. This coder 220 may be whichever coder desired; in the preferred embodiment a convolution coder is employed, by means of which the common quality requirement may be moderated.

The signal 250 thus coded is further fed to the means 222 where the justification of the number of symbols is carried out for the frames to be transmitted so that the length of symbols transmitted in each frame equals that of a multifold of a known time interval which is essentially shorter than the symbol length. If the CDMA method is employed, a multifold of the spreading code bit, i.e. chip, is feasible.

As described above, the number of symbols can be justified either by repeating or deleting symbols, both of which methods can be carried out by means of signal processing, as a person skilled in the art will realize.

The transmitter according to the invention further comprises means 234 for combining the signal frames which are to be transmitted and whose symbols have been justified with indication of the frame structure of each frame, for example, the bit rate. Said indication of the frame structure is first fed to the coding means 232 where the desired coding is carried out for protecting the information against transmission errors, and which coded signal is fed to the multiplexing means 238. Said indication may include, for example, a description on the frame structure of the frame in question, or on the structure of the subsequent frame to be transmitted. The signal 252 thus combined is further fed to the interleaving means 236.

The transmitter may comprise multiplexing means 238 where the interleaved signal is combined with additional information, such as power adjusting information 230 or reference symbols 228 for coherent reception. In a CDMA transmitter, the combined signal 240 is further fed to means 242 where the signal is multiplied by a spreading code unique for the connection whereby the signal spreads onto the frequency band used. The signal thus multiplied is further fed to the radio frequency parts where the signal is converted onto radio frequency and amplified to be transmitted by the antenna 246.

The transmitter according to the invention comprises control means 254 which control the operation of the parts described above, and which means may be implemented by means of a microprocessor or control logic. The control means 254 also provide adjusting for the radio frequency means 244 on the transmitting power of each frame to be transmitted, which depends on the number of symbols in the frame after the multiplexer 214.

In the following, a second preferred embodiment of the method and transmitter according to the invention is examined by means of a block diagram illustration of a transmitter shown in FIG. 2b. In the embodiment of FIG. 2b, the indication of the frame structure 226 of the channel and other reference information 228, 230 are transmitted in a separate physical channel which is independent of the data channel. Thereby, it is possible for the power adjusting of the channels to be independent of each other, which is advantageous as far as the implementation is concerned.

In the solution according to the embodiment, the data signal 224 to be transmitted is multiplied by a desired spreading code in the multiplying means 242a, from which the signal is fed to the radio frequency parts 244. The indication on the channel frame structure 226 is, after the coding parts 232 and the interleaving 236, fed to the multiplexer 238 where the frame structure signal is combined with the other desired reference information 228, 230. The signal 262 thus obtained is multiplied by a desired spreading code in the multiplier 242b. The spreading code used may either be the same or different than the spreading code 242a used in the data transmission. The multiplied signal is further fed to the radio frequency parts 244.

Figure 2A:
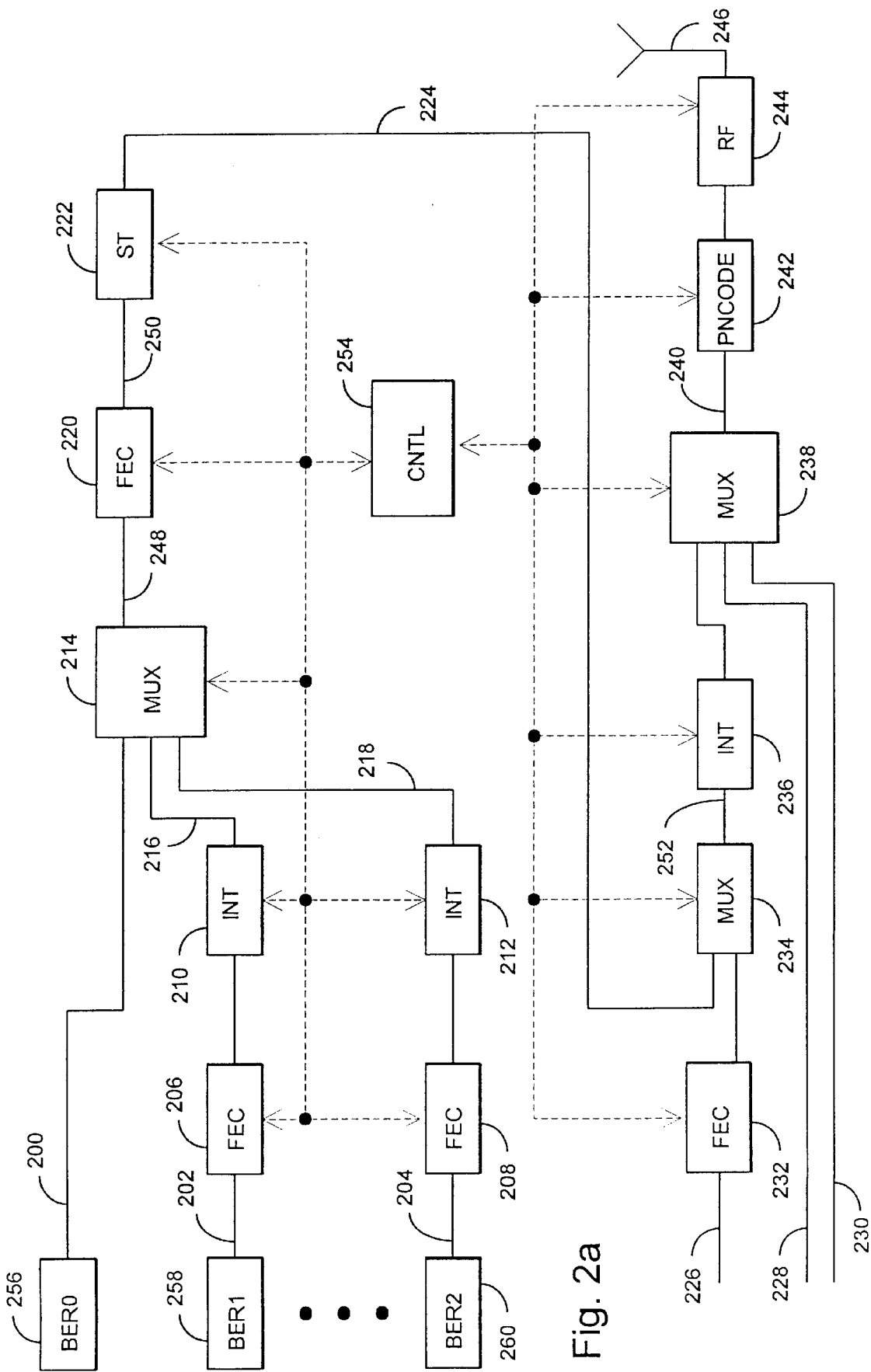
FIGS. 2a and 2b illustrate, by means of a block diagram, two alternative structures of a transmitter according to the invention.
Figure 2B:
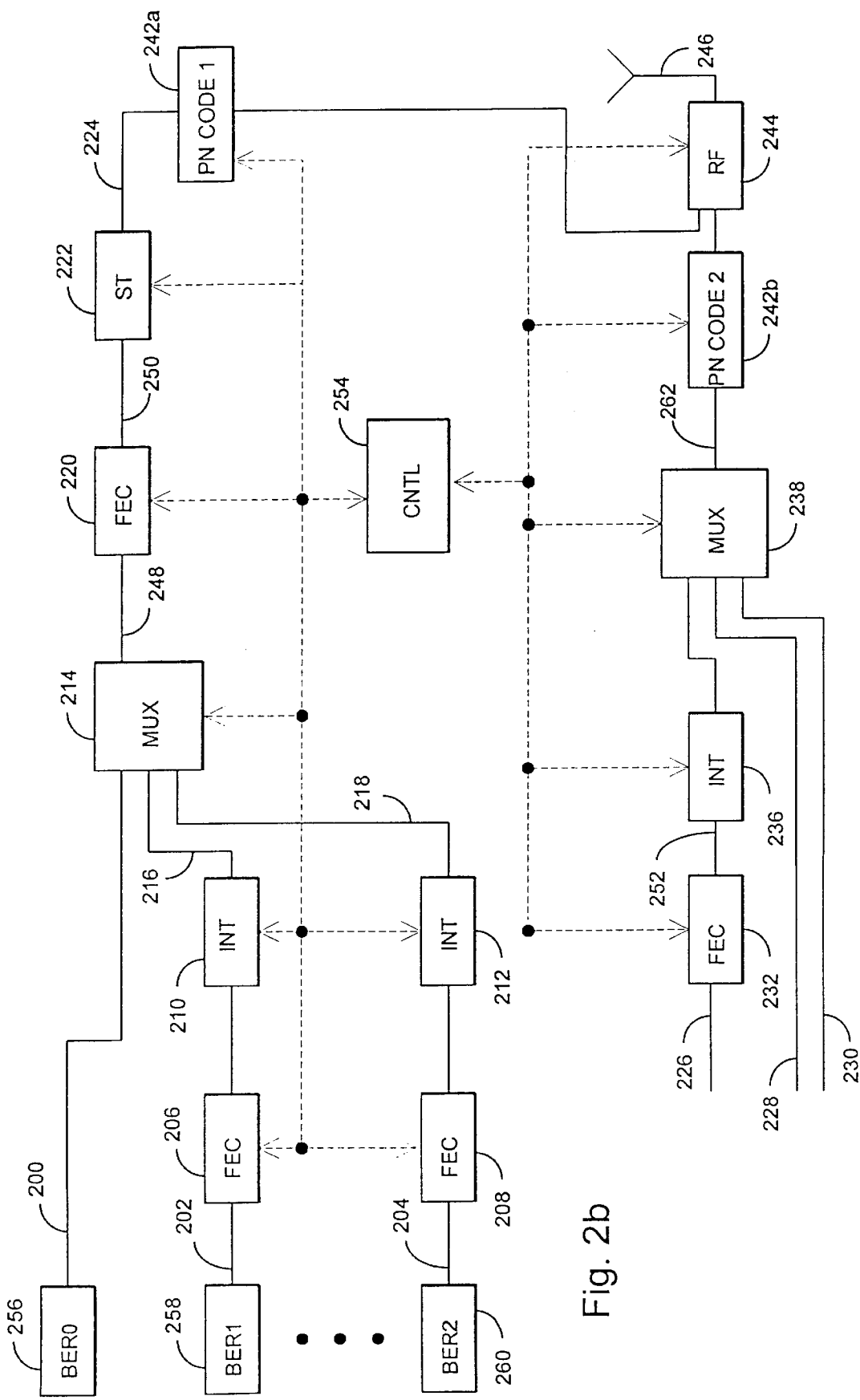

The transmitter of the invention naturally includes other components as well, such as filters and transformers, which is obvious for a person skilled in the art, but due to reasons of clarity they are not shown in the FIGS. 2a and 2b nor mentioned in their description.

Although the invention is above described with reference to the examples of the attached drawings, it is obvious that the invention is not restricted thereto, but it can be modified in various ways within the inventive idea of the attached claims.

We claim:

1. A data transmission method in a wireless data transmission system where signals (200, 202, 204) with one or more data rates and quality levels are transmitted simultaneously, characterized in that outer coding (206, 208) is performed for at least some of the signals so that all the signals to be transmitted have a common quality level, and that signals thus acquired having the same quality level are combined into frames of a given length, and that inner coding (220) is performed for the combined signal, and that some symbols are repeated or deleted in the frames to be transmitted, if necessary, so that the length of the symbols of each frame is a multifold of a time interval that is known and essentially shorter than the symbol length, and that the transmitting power used for transmitting each frame depends on the number of bits each frame had prior to symbol repetition.

2. A method as claimed in claim 1, characterized in that outer coding is carried out for those signals that have a higher quality level set than the lowest quality level of the system.

3. A method as claimed in claim 1, characterized in that interleaving (210, 212) is carried out for the signals to be transmitted prior to the combining of the signals.

4. A method as claimed in claim 1, characterized in that the frames to be transmitted, in which symbols have been repeated or deleted, if necessary, are combined with indication of the frame structure (226), which indication is coded as desired, and that the frames thus combined are interleaved (234).

5. A method as claimed in claim 4, characterized in that the interleaved frames are combined with additional reference information (228).

6. A method as claimed in claim 4, characterized in that the interleaved frames are combined with power adjusting information (230).

7. A method as claimed in claim 4, characterized in that the indication of the frame structure and the reference symbols are placed to one or more groups in the frame to be transmitted.

8. A method as claimed in claim 4, characterized in that indication is transmitted in each frame of the structure of the subsequent frame to be transmitted.

9. A method as claimed in claim 7, characterized in that the reference symbol and the frame structure symbol groups are transmitted at a higher power in the frame than the other symbols of the frame.

10. A method as claimed in claim 1, characterized in that inner coding is carried out by convolution code, and outer coding by Reed-Solomon code.

11. A method as claimed in claim 1, characterized in that the indication of the frame structure (226) of the information to be transmitted, which indication has been coded (232) and interleaved (236) as desired, is transmitted in a separate channel independent of the information to be transmitted.

12. A method as claimed in claim 11, characterized in that the frame structure indication (226) is combined with additional reference information (228) and power adjusting information (230).

13. A transmitter intended to be used in a wireless data transmission system where signals with one or more data rates and quality levels are transmitted simultaneously, characterized in that the transmitter comprises means (206, 208) for carrying out outer coding for at least some of the signals to be transmitted so that all the signals to be transmitted have a common quality level, means (214) for combining the signals to be transmitted into frames having a given length, means (220) for carrying out inner coding for the frames to be transmitted, means (222) for repeating or deleting symbols in each frame, if necessary, so that the length of the symbols of each frame equals that of a multifold of a time interval that is known and essentially shorter than the symbol length, as well as means (254) for adjusting the transmitting power used during transmission of each frame proportionally to the number of symbols each frame had prior to symbol repetition.

14. A transmitter as claimed in claim 13, characterized in that the transmitter comprises means (206, 208) for carrying out outer coding for those signals whose quality level is set higher than the lowest quality level in the system.

15. A transmitter as claimed in claim 13, characterized in that the transmitter comprises first means (210, 212) for carrying out interleaving for the signals to be transmitted prior to the combining of the signals.

16. A transmitter as claimed in claim 13, characterized in that the transmitter comprises means (234) for combining the frames to be transmitted with indication of the frame structure (226) of the frame, which means (234) are operationally connected to the output of means (222) adjusting the number of symbols, and second means (236) for carrying out interleaving for the signal (252) thus obtained.

17. A transmitter as claimed in claim 16, characterized in that the transmitter comprises means (238) for combining the frames to be transmitted with symbols (228, 230) containing additional information, which means (238) are operationally connected to the output of the second interleaving means (236).

18. A transmitter as claimed in claim 13, characterized in that the transmitter comprises means (234) for combining the frames to be transmitted with indication of the frame structure (226) of the subsequent frame to be transmitted, which means (234) are operationally connected to the output of the means (222) which adjust the number of symbols.

19. A transmitter as claimed in claim 13, characterized in that the transmitter comprises means (232) for coding and interleaving (236) the indication of the frame structure of the information to be transmitted, means (238) for combining said interleaved indication with symbols (228, 230) containing additional information, and means (242b, 244) for transmitting said symbols in a separate channel independent of the channel transferring information.

* * * * *